US010069761B2

(12) United States Patent
Bailey et al.

(10) Patent No.: US 10,069,761 B2
(45) Date of Patent: *Sep. 4, 2018

(54) DYNAMIC ALLOCATION OF WORKLOAD DEPLOYMENT UNITS ACROSS A PLURALITY OF CLOUDS

(71) Applicant: International Business Machines Corporation, Armonk, NY (US)

(72) Inventors: Bret A. Bailey, Flower Mound, TX (US); Leonard S. Hand, Red Creek, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 139 days.

This patent is subject to a terminal disclaimer.

(21) Appl. No.: 14/706,556

(22) Filed: May 7, 2015

(65) Prior Publication Data
US 2015/0244646 A1 Aug. 27, 2015

Related U.S. Application Data

(63) Continuation of application No. 13/441,512, filed on Apr. 6, 2012, now Pat. No. 9,071,613.

(51) Int. Cl.
*H04L 12/911* (2013.01)
*H04L 29/08* (2006.01)
(Continued)

(52) U.S. Cl.
CPC .......... *H04L 47/829* (2013.01); *G06F 9/5027* (2013.01); *H04L 67/1002* (2013.01);
(Continued)

(58) Field of Classification Search
CPC ...... G06F 9/5072; G06F 9/505; G06F 1/3203; G06F 2209/503; G06F 9/485;
(Continued)

(56) References Cited

U.S. PATENT DOCUMENTS

| 6,856,991 B1* | 2/2005 | Srivastava | ........ H04L 29/12066 |
| 6,990,666 B2* | 1/2006 | Hirschfeld | .............. G06F 9/485 |
| | | | 709/203 |

(Continued)

FOREIGN PATENT DOCUMENTS

| CN | 102232282 A | 11/2011 |
| CN | 103365725 A | 10/2013 |

(Continued)

OTHER PUBLICATIONS

Vecchiola, C., et al., "Aneka: A Software Platform for .NET-based Cloud Computing," in High Speed and Large Scale Scientific Computing, IOS Press, 2009, 30 pgs.

(Continued)

*Primary Examiner* — Edward Kim
(74) *Attorney, Agent, or Firm* — Cuenot, Forsythe & Kim, LLC (57) ABSTRACT

A method of selectively allocating a plurality of deployment units among a plurality of clouds. The method can include identifying a first context of a first deployment unit of a workload and identifying a second context of a second deployment unit of the workload. Based on the first context, a first of the plurality of clouds that satisfies at least one requirement indicated by the first context can be identified and the first deployment unit can be automatically allocated to the first cloud. Based on the second context, a second of the plurality of clouds that satisfies at least one requirement indicated by the second context can be identified, wherein the first cloud does not satisfy the requirement indicated by the second context, and the second deployment unit can be automatically allocated to the second cloud.

20 Claims, 5 Drawing Sheets

(51) Int. Cl.
  *G06F 9/50* (2006.01)
  *H04W 4/60* (2018.01)
(52) U.S. Cl.
  CPC .......... *H04L 67/1036* (2013.01); *H04W 4/60* (2018.02); *G06F 9/5055* (2013.01); *G06F 2209/501* (2013.01)
(58) Field of Classification Search
  CPC . G06F 9/5061; G06F 9/5077; H04L 67/1029; H04L 67/30; G06Q 10/06; G06Q 10/06393
  USPC ................. 709/223, 225, 227, 228, 238–245
  See application file for complete search history.

(56) References Cited

U.S. PATENT DOCUMENTS

| | | |
|---|---|---|
| 7,406,691 B2 | 7/2008 | Fellenstein et al. |
| 7,441,241 B2 | 10/2008 | Dawson et al. |
| 7,472,079 B2 | 12/2008 | Fellenstein et al. |
| 7,502,850 B2 | 3/2009 | Fellenstein et al. |
| 7,562,143 B2 | 7/2009 | Fellenstein et al. |
| 7,571,120 B2 | 8/2009 | Fellenstein et al. |
| 7,574,496 B2 * | 8/2009 | McCrory ................. H04L 29/06 370/231 |
| 7,577,722 B1 | 8/2009 | Khandekar et al. |
| 7,590,623 B2 | 9/2009 | Fellenstein et al. |
| 7,668,741 B2 | 2/2010 | Ernest et al. |
| 7,712,100 B2 | 5/2010 | Fellenstein et al. |
| 7,917,617 B1 | 3/2011 | Ponnapur et al. |
| 9,071,613 B2 | 6/2015 | Bailey et al. |
| 9,086,929 B2 | 7/2015 | Bailey et al. |
| 2003/0105810 A1 * | 6/2003 | McCrory ................. H04L 29/06 709/203 |
| 2008/0256228 A1 | 10/2008 | Fellenstein et al. |
| 2009/0216883 A1 | 8/2009 | Fellenstein et al. |
| 2010/0125664 A1 * | 5/2010 | Hadar ................... G06F 9/5072 709/224 |
| 2010/0223378 A1 * | 9/2010 | Wei ..................... H04L 41/0896 709/224 |
| 2010/0268764 A1 * | 10/2010 | Wee ........................ G06F 9/505 709/203 |
| 2010/0306354 A1 * | 12/2010 | DeHaan ................ G06F 1/3203 709/222 |
| 2011/0016473 A1 | 1/2011 | Srinivasan |
| 2011/0078303 A1 * | 3/2011 | Li ............................ G06F 9/505 709/224 |
| 2011/0126168 A1 | 5/2011 | Ilyayev |
| 2011/0126207 A1 | 5/2011 | Wipfel et al. |
| 2011/0131309 A1 * | 6/2011 | Akiyama ................ H04L 12/14 709/223 |
| 2011/0131335 A1 * | 6/2011 | Spaltro ................. G06F 9/5072 709/228 |
| 2011/0138047 A1 | 6/2011 | Dawson et al. |
| 2011/0138049 A1 | 6/2011 | Dawson et al. |
| 2011/0145392 A1 | 6/2011 | Dawson et al. |
| 2011/0154318 A1 | 6/2011 | Oshins et al. |
| 2011/0161947 A1 | 6/2011 | Ashok et al. |
| 2011/0161952 A1 | 6/2011 | Poddar et al. |
| 2011/0231552 A1 * | 9/2011 | Carter ................... G06F 9/5072 709/226 |
| 2011/0258317 A1 | 10/2011 | Sinha et al. |
| 2011/0282982 A1 * | 11/2011 | Jain ....................... G06F 9/5094 709/223 |
| 2011/0296023 A1 * | 12/2011 | Ferris ..................... G06F 9/541 709/226 |
| 2012/0204176 A1 | 8/2012 | Tian et al. |
| 2013/0024862 A1 | 1/2013 | Lim et al. |
| 2013/0080623 A1 * | 3/2013 | Thireault .............. G06F 9/5027 709/224 |
| 2013/0268674 A1 | 10/2013 | Bailey et al. |
| 2013/0268861 A1 | 10/2013 | Bailey et al. |
| 2015/0244792 A1 | 8/2015 | Bailey et al. |

FOREIGN PATENT DOCUMENTS

| | | |
|---|---|---|
| CN | 104205056 A | 12/2014 |
| DE | 112013001889 T5 | 12/2014 |
| IN | 1787CHE2011 A | 6/2011 |
| WO | 2011091056 A1 | 7/2011 |
| WO | 20130149339 A1 | 10/2013 |

OTHER PUBLICATIONS

Creese et al., "Data Protection-Aware Design for Cloud Computing," White Paper, HP Laboratories, HPL-2009-192, Aug. 21, 2009, 13 pgs.
Cheng, G., et al., "Building Dynamic Integrity Protection for Multiple Independent Authorities in Virtualization-based Infrastructure," 2009 10th IEEE/ACM Int'l. Conf. on Grid Computing, Oct. 13-15, 2009, 8 pgs.
Paton, N.W., et al., "Optimizing Utility in Cloud Computing through Autonomic Workload Execution," IEEE Data Eng. Bull., vol. 32, No. 1, 2009, 8 pgs.
"Exploiting the Cloud for Mission-Critical Workloads via the Hybrid Enterprise," Unisys, Whitepaper, 2011, 12 pgs.
Anonymous, "Dynamic Virtual Server Consolidation based on Network Traffic in Cloud Computing Environment," [online] IP.com Prior Art Database Disclosure, retrieved from the Internet: <http://priorartdatabase.com/IPCOM000210401D>, Sep. 2, 2011, 10 pgs.
IBM, "Method of Creating a Componentized Architecture for Unifying Resource Sharing Scenarios in Cloud Computing Environment," [online] IP.com Prior Art Database Disclosure, retrieved from the Internet: <http://priorartdatabase.com/IPCOM000193146>, Feb. 11, 2010, 14 pgs.
Lin, J. et al., "VegaWarden: A Uniform User Management System for Cloud Applications," Proc. of the 2010 IEEE Int'l Conf. on Networking, Architecture, and Storage (NAS 2010), pp. 457-464, Jul. 15-17, 2010, 8 pgs.
WIPO PCT Appln. No. PCT/CA2013/050258, International Search Report, Jul. 30, 2013, 3 pg.
WIPO PCT Appln. No. PCT/CA2013/050258, International Preliminary Report on Patentability, Oct. 7, 2014.
U.S. Appl. No. 13/441,512, Non-Final Office Action, dated Dec. 5, 2013, 10 pg.
U.S. Appl. No. 13/441,512, Non-Final Office Action, dated Mar. 28, 2014, 10 pg.
U.S. Appl. No. 13/441,512, Final Office Action, dated Nov. 5, 2014, 10 pg.
U.S. Appl. No. 13/441,512, Notice of Allowance, dated Feb. 25, 2015, 17 pg.
U.S. Appl. No. 13/441,526, Non-Final Office Action, dated Jul. 31, 2014, 13 pg.
U.S. Appl. No. 13/441,526, Notice of Allowance, dated Mar. 12, 2015, 11 pg.

* cited by examiner

DYNAMIC ALLOCATION OF WORKLOAD DEPLOYMENT UNITS ACROSS A PLURALITY OF CLOUDS

CROSS-REFERENCE TO RELATED APPLICATIONS

This application is a Continuation of U.S. application Ser. No. 13/441,512, filed on Apr. 6, 2012, the entirety of which is incorporated herein by reference.

BACKGROUND

One or more embodiments disclosed within this specification relate to cloud computing and, more particularly, to deployment of a workload in a cloud computing environment.

Cloud computing is a model of service delivery for enabling convenient, on-demand network access to a shared pool of configurable computing resources. In this regard, shared resources may be provided to computers and other devices as a utility over a network, such as a private network and/or a public network (e.g., the Internet). The resources can include computation/processing, software applications, data access, data management and data storage. End users need not know the specific location or other details of a cloud infrastructure. Nonetheless, end users can access cloud based applications through a web browser or a light weight desktop or mobile application, while business software and data can be stored in the cloud.

BRIEF SUMMARY

One or more embodiments disclosed within this specification relate to cloud computing and, more particularly, to deployment of a workload in a cloud computing environment.

An embodiment can include a method of selectively allocating a plurality of deployment units among a plurality of clouds. The method can include identifying a first context of a first deployment unit of a workload and identifying a second context of a second deployment unit of the workload. Based on the first context, a first of the plurality of clouds that satisfies at least one requirement indicated by the first context can be identified and the first deployment unit can be automatically allocated to the first cloud. Based on the second context, a second of the plurality of clouds that satisfies at least one requirement indicated by the second context can be identified, wherein the first cloud does not satisfy the requirement indicated by the second context, and the second deployment unit can be automatically allocated to the second cloud.

Another embodiment can include a method of selectively allocating a plurality of deployment units among a plurality of clouds. The method can include identifying a first context of a first deployment unit of a workload and identifying a second context of a second deployment unit of the workload, wherein the first context indicates at least one requirement associated with the first deployment unit and the second context indicates at least one requirement associated with the second deployment unit. The method also can include performing a first audit of a first cloud to determine whether, for each of the respective first and second contexts, the first cloud satisfies the requirement indicated by the context, and performing a second audit of a second cloud to determine whether, for each of the respective first and second contexts, the second cloud satisfies the requirement indicated by the context. Based on the first and second audits, a deployment plan can be automatically created. The deployment plan can identify to which of at least the first and second clouds the first deployment unit is to be allocated and to which of at least the first and second clouds the second deployment unit is to be allocated. Based on the deployment plan, the first deployment unit can be automatically allocated to the first cloud and the second deployment unit can be automatically allocated to the second cloud.

Another embodiment can include a system having a processor and memory. The processor can be configured to initiate executable operations and/or functions as described within this specification.

Another embodiment can include a computer program product for selectively allocating a plurality of deployment units among a plurality of clouds. The computer program product can include a computer-readable storage medium having stored thereon program code that, when executed, configures a processor to perform the various functions and/or operations described within this specification.

DETAILED DESCRIPTION

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises. Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes. In this regard, the term "cloud," as used herein, means a computing infrastructure comprising a plurality of nodes interconnected via a suitable communication network and, from the perspective of a client, together appear as a single resource. Although the cloud appears to the client as a single resource, via the various nodes of the cloud, the cloud can provide to the client a myriad of different functions, such as data processing, data storage, services, applications, etc. By way of example, a cloud can appear to the client as a single server, though in actuality the cloud may comprise a plurality of servers, storage systems, networking components, services, applications, etc., as will be described herein. Accordingly, cloud may be referred to herein as a "host."

Figure 1:
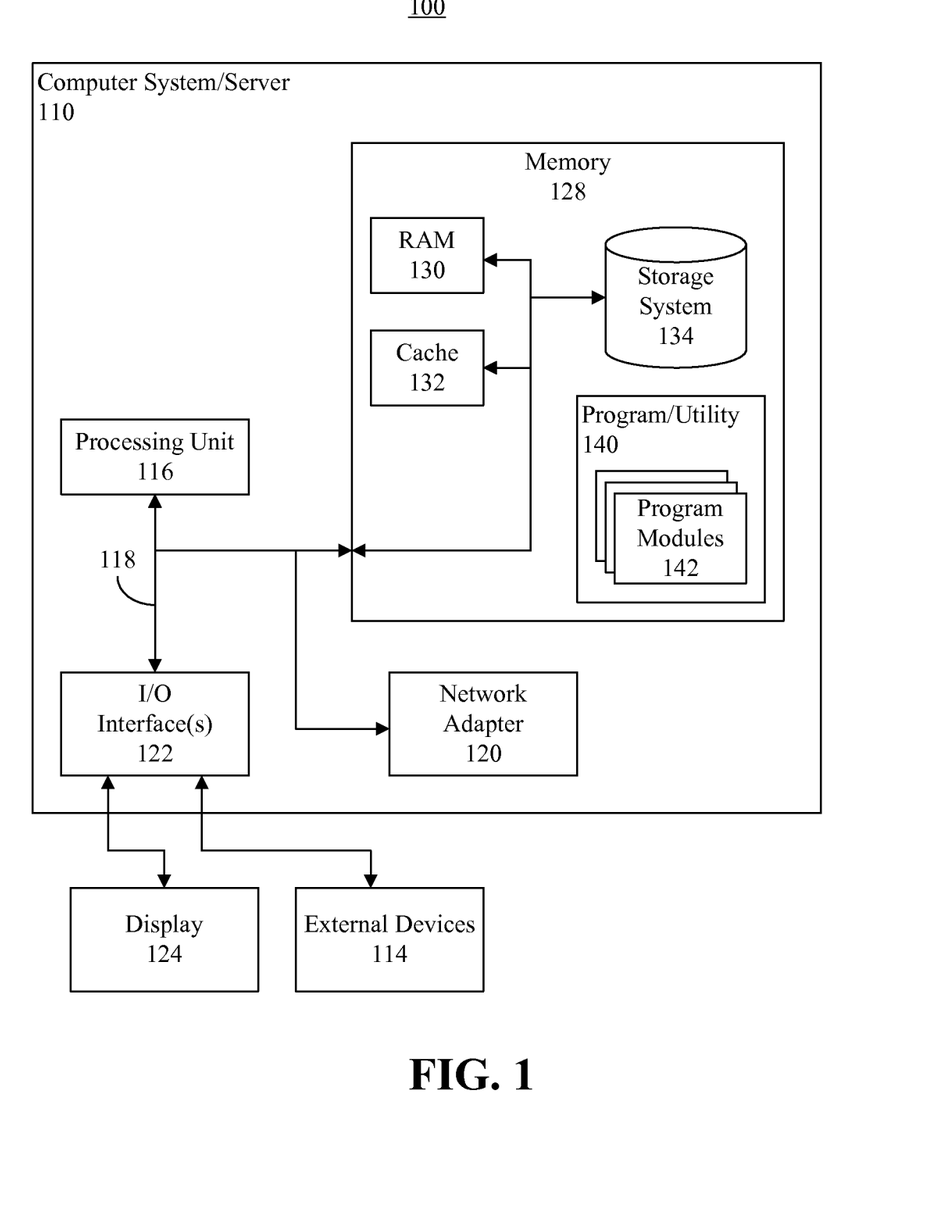
FIG. 1 is a block diagram illustrating a computer system/server of a cloud computing node in accordance with one embodiment of the present invention.

Referring now to FIG. 1, a block diagram of an example of a cloud computing node is shown. The cloud computing node 100 is only one example of a suitable cloud computing node and is not intended to suggest any limitation as to the scope of use or functionality of embodiments of the invention described herein. Regardless, the cloud computing node 100 is capable of being implemented and/or performing any of the functionality set forth hereinabove.

The cloud computing node 100 can include a processing system/server 110, which is operational with numerous other general purpose or special purpose computing system environments or configurations. Examples of well-known computing systems, environments, and/or configurations that may be suitable for use with processing system/server 110 include, but are not limited to, personal computer systems, server computer systems, control nodes, storage area network (SAN) controllers, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The processing system/server 110 may be described in the general context of computer system executable instructions, such as program modules, being executed by a computer system or other processing system. Generally, program modules may include routines, programs, objects, components, logic, data structures, and so on that perform particular tasks or implement particular abstract data types. The processing system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the processing system/server 110 in the cloud computing node 100 is shown in the form of a general-purpose computing device. The components of the processing system/server 110 may include, but are not limited to, one or more processors or processing units 116, a system memory 128, and a bus 118 that couples various system components including system memory 128 to the processor 116.

The bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The processing system/server 110 typically may include a variety of computer-readable storage media. Such media may be any available media that is accessible by the processing system/server 110, and it includes both volatile and non-volatile media, removable and non-removable media. System memory 128 can include computer-readable storage media in the form of volatile memory, such as random access memory (RAM) 130 and/or cache memory 132. The processing system/server 110 may further include other removable/non-removable, volatile/non-volatile computer-readable storage media. By way of example only, a storage system 134 can be provided for reading from and writing to at least one non-volatile computer-readable storage media. Examples of computer-readable storage media can include, but are not limited to, a data storage device that comprises non-volatile magnetic media (e.g., a "hard disk drive" or "HDD"), a data storage device that comprises non-volatile solid state media (e.g., a "solid state drive" or "SSD"), a data storage device that comprises non-volatile magneto-optical media, and the like. Although not shown, a magnetic disk drive for reading from and writing to a removable, non-volatile magnetic disk (e.g., a "floppy disk"), an optical disk drive for reading from or writing to a removable, non-volatile optical disk such as a CD-ROM, DVD-ROM or other optical media, a solid state drive for reading from or writing to a removable, non-volatile, solid state drive can be provided. In such instances, each can be connected to the bus 118 by one or more data media interfaces, such as a fiber channel interface, a serial advanced technology attachment (SATA) interface, fiber channel interface, a small computer system interface (SCSI) interface, a serial attached SCSI (SAS) interface, or the like.

The memory 128 may include at least one computer program product that includes a computer-readable storage medium having computer-readable program code embodied therewith. The "computer-readable storage medium" can be non-transitory in nature. The computer-readable program code can include a set (e.g., at least one) of program modules 142 that are configured to carry out the functions of embodiments of the invention. The program/utility 140, having a set (at least one) of program modules 142, may be stored in the memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of embodiments of the invention as described herein.

The processing system/server 110 may also communicate with one or more external devices 114 such as a keyboard, a pointing device, a display 124, etc.; one or more devices that enable a user to interact with processing system/server 110; and/or any devices (e.g., network card, modem, etc.) that enable processing system/server 110 to communicate with one or more other computing devices. Such communication can occur via Input/Output (I/O) interfaces 122. Still yet, the processing system/server 110 can communicate with one or more networks such as a local area network (LAN), a general wide area network (WAN), and/or a public network (e.g., the Internet) via network adapter 120. As depicted, the network adapter 120 can communicate with the other components of the processing system/server 110 via the bus 118. It should be understood that although not shown, other hardware and/or software components could be used in conjunction with the processing system/server 110. Examples, include, but are not limited to: microcode, device drivers, redundant processing units, external disk drive arrays, RAID systems, tape drives, and data archival storage systems, etc.

Figure 2:
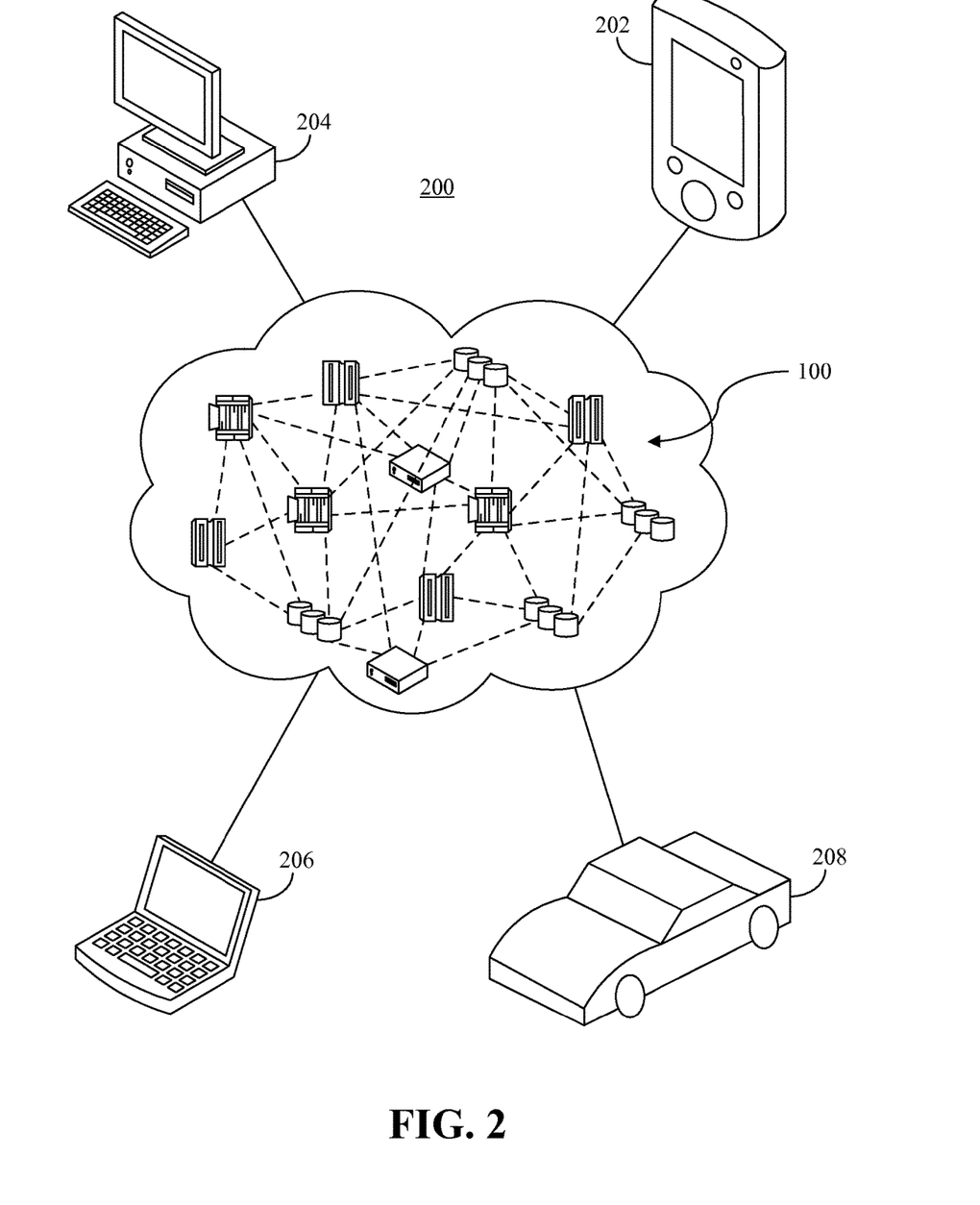
FIG. 2 depicts a cloud computing environment in accordance with one embodiment of the present invention.

Referring now to FIG. 2, an illustrative cloud computing environment 200 is depicted. As shown, the cloud computing environment 200 comprises one or more cloud computing nodes 100 with which local computing devices used by cloud consumers, such as, for example, a personal digital assistant (PDA) or cellular telephone 202, a desktop computer (or workstation) 204, a laptop computer 206, and/or an automobile computer system 208 may communicate. The computing nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 202-208 shown in FIG. 2 are intended to be illustrative only and that the computing nodes 100 and cloud computing environment 200 can communicate with any type of computerized device over any type of network and/or network addressable connection (e.g., using a web browser).

Figure 3:
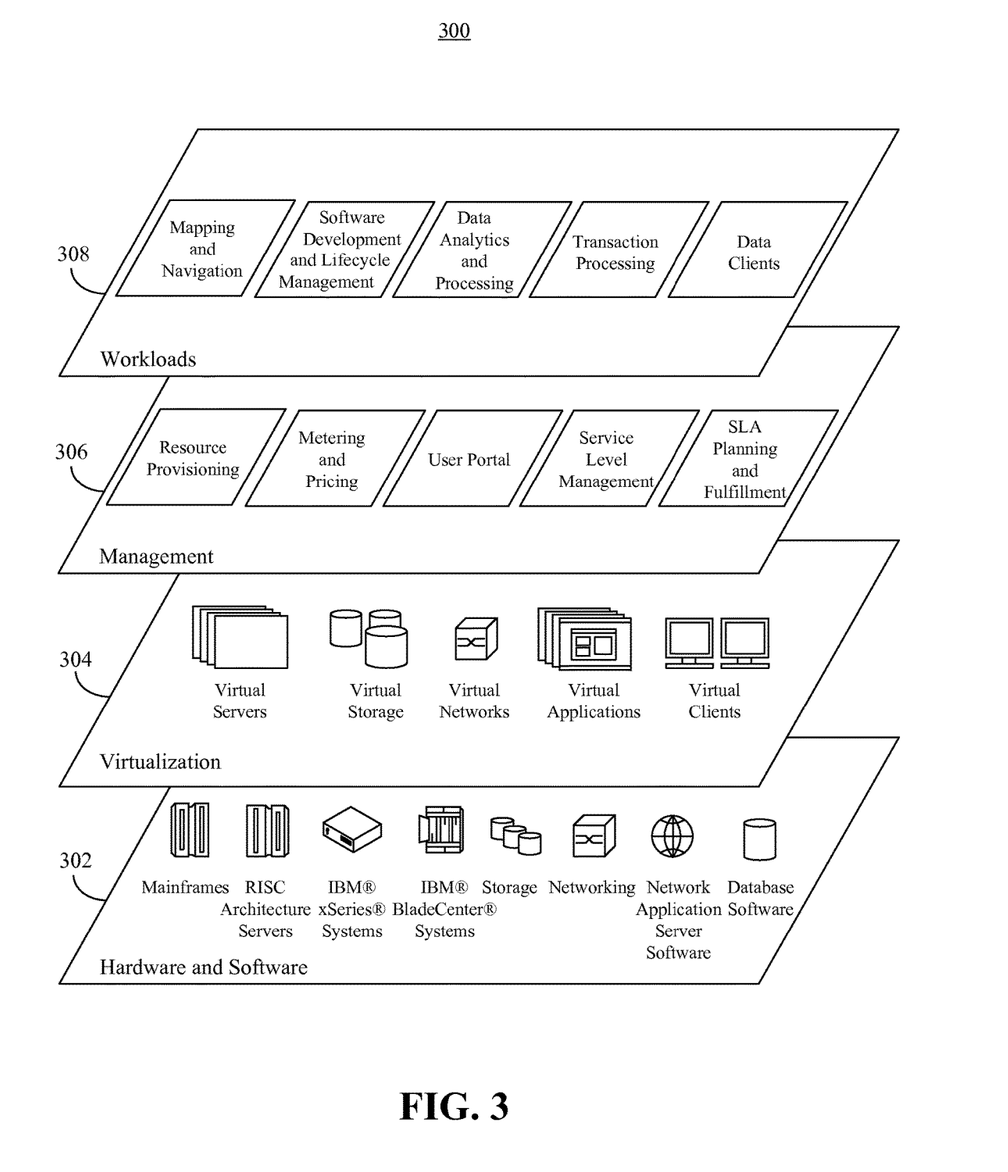
FIG. 3 depicts functional abstraction layers provided by cloud computing environment in accordance with one embodiment of the present invention.

Referring now to FIG. 3, a set 300 of functional abstraction layers provided by cloud computing environment 200 (FIG. 2) is shown. It should be understood in advance that the components, layers, and functions shown in FIG. 3 are intended to be illustrative only and embodiments of the invention are not limited thereto. As depicted, the following layers and corresponding functions are provided:

A hardware and software layer 302 can include hardware and software components. Examples of hardware components include, but are not limited to, mainframes, in one example IBM® zSeries® systems; RISC (Reduced Instruction Set Computer) architecture based servers, in one example IBM pSeries® systems; IBM xSeries® systems; IBM BladeCenter® systems; storage systems (e.g., storage arrays, network attached storages (NASs), and the like); and networking components. Networking components can include any of a variety of routers, switches, network adapters, and the like.

Examples of software components include network application server software, in one example IBM WebSphere® application server software; and RAID array control software, in one example IBM SAN volume controller, which can execute on an IBM SVC Storage Engine. (IBM, zSeries, pSeries, xSeries, BladeCenter, WebSphere, and DB2 are trademarks of International Business Machines Corporation registered in many jurisdictions worldwide). The software components also may include database software which contains data related to the configuration of the cloud computing environment.

A virtualization layer 304 can provide an abstraction layer from which the following examples of virtual entities may be provided: virtual servers; virtual storage; virtual networks, including virtual private networks; virtual applications and operating systems; and virtual clients.

In one example, a management layer 306 may provide the functions described below. Resource provisioning provides dynamic procurement of computing resources and other resources that are utilized to perform tasks within the cloud computing environment. Storage management manages the virtual storage within the cloud computing environment. The user portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

A workloads layer 308 can provide workloads for which the cloud computing environment may be utilized. Examples of workloads and functions which may be provided from this layer may include, but are not limited to, mapping and navigation, software development and lifecycle management, data analytics processing, transaction processing, and data clients. Still, the workloads layer 308 can include any other applications and/or workloads suitable to be deployed in a cloud computing environment, and the invention is not limited in this regard.

Figure 4:
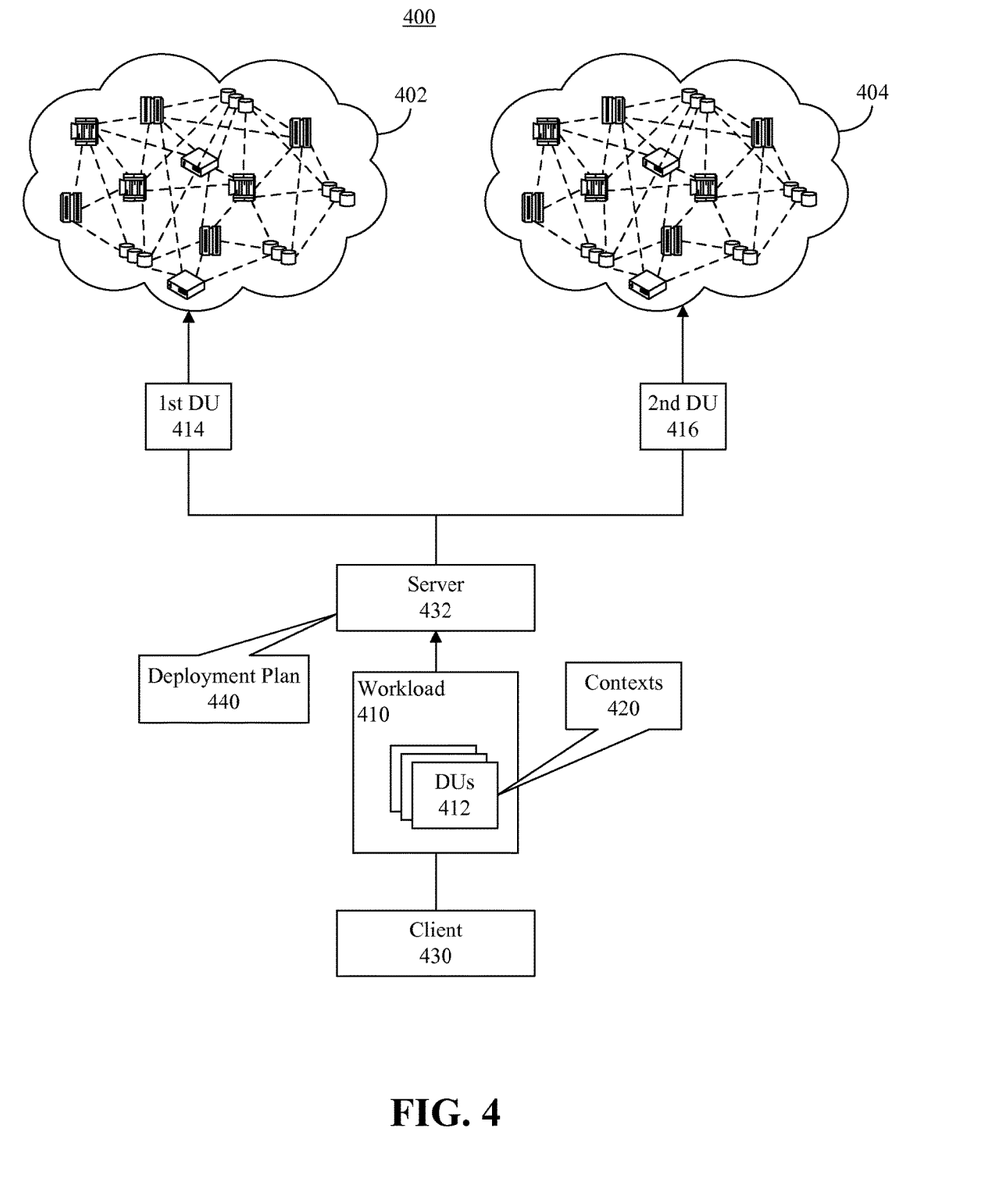
FIG. 4 depicts a system comprising a plurality of clouds to which deployment units of a workload can be allocated in accordance with one embodiment of the present invention.

FIG. 4 depicts a system 400 comprising a plurality of clouds 402, 404 to which deployment units 412 of a workload 410 can be selectively allocated in accordance with one embodiment of the present invention. In operation, a client 430 can communicate the workload 410 to a processing system comprising at least one processor and at least one memory, such as a server 432. In this regard, the server 432 can implemented in accordance with the description of the processing system/server 110 of FIG. 1, though the server 432 need not be a node of a cloud, though it can be. The client 430 can communicate the workload 410 to the server 432 at the behest of a user (i.e., a person), or at the behest of an automated process executing on the client 430 or the server 432.

As used herein, the term "client" means a processing device or system, such as a workstation, desktop computer, mobile computer, tablet computer or the like that resides client-side in a client/server(s) relationship. In one embodiment, the server 432 can be communicatively linked to the clouds 402, 404 via a suitable communication network, for example a public network, such as the Internet, and/or a private network, such as a local area network (LAN) a wide area network (WAN), or the like. In another embodiment, the server 432 can be a node within the cloud 402 or the cloud 404. For example, the server 432 can host a client or user portal via which the client 430 can interface with the server 432 to provide the workload 410. Regardless of whether the server 432 is a cloud node, the client 430 can be communicatively linked to the server 432 via a public network and/or a private network.

As used herein, the term "workload" means a unit of work to be performed by one or more computing resources. The workload 410 can comprise a plurality of deployment units 412. As used herein, the term "deployment unit" means an asset of a workload. In illustration, a deployment unit 412 can be an executable application, process or function, cohesive data, or the like. In illustration, the workload 410 can include a deployment unit 412 that is an executable application, and a deployment unit 412 that comprises data executed by the application, for example one or more data tables. The invention is not limited to these specific examples, however.

The deployments units 412 can be persisted to a cloud 402, 404 (e.g., stored to a computer-readable storage medium), or processed by a cloud 402, 404 without being persisted. For example, an executable application can be persisted to a cloud 402, 404, though this need not be the case. Similarly, in some circumstances, data can be processed by a cloud 402, 404 to generate a result that is communicated to the server 432 and/or the client 430, but such data need not be persisted to the cloud 402, 404. For instance, the data can be stored to local memory within a cloud node, and purged once the result is generated. In other circumstances, the data can be persisted to the cloud 402, 404, depending on requirements specified for such data.

Contexts 420 can be associated with the various deployment units 412. For example, the deployment units 412 can include metadata providing the contexts 420, or the client 430 can associate the contexts 420 with the respective deployment units, for example in response to one or more user inputs or one or more data files associated with the deployment units. The contexts 420 can relate to functional requirements for the deployment units 412 or non-functional requirements for the deployment units 412. As used herein, the term "functional requirement" means a requirement that is to be satisfied in order for a deployment unit to function within a cloud. As used herein, the term "non-functional requirement" means a requirement that need not be satisfied in order for a deployment unit to function within a cloud, but nonetheless is to be satisfied by the cloud.

By way of example, a functional requirement can specify resources necessary to process and/or store the deployment units 412. A non-function requirement can, for example, specify requirements related to cloud security, cloud performance, or the like. Requirements related to cloud security can include, but are not limited to, encryption protocols, communication protocols (e.g., tunneling protocols), log-in procedures, specific security software, firewall configuration, etc. Requirements related to cloud performance can include, but are not limited to, processing power, memory capacity, memory transfer rate, storage capacity, storage transfer rate, storage latency, network bandwidth, network latency, service level agreements, and so on.

Based on the contexts 420 associated with the various deployment units 412, the server 432 can audit the plurality of clouds 402, 404 to determine whether the clouds 402, 404 satisfy the requirements indicated by the respective contexts 420 of the various deployment units. In illustration, the audit can identify which clouds 402, 404 satisfy respective ones of the contexts 420. To perform the audit, the server 432 can access and process service level agreements associated with the clouds 402, 404, access and process location models associated with the clouds 402, 404, query the clouds, 402, 404, or the like. The service level agreements can indicate minimum service levels that are to be provided by the respective clouds, including performance parameters, security implementation, and the like. The location models can provide documentation pertaining to service levels actually provided by the respective clouds, including performance parameters, security implementation, and the like.

In some instances, more than one cloud 402, 404 may satisfy the requirements for a particular deployment unit, such as a first deployment unit 414. The server 432 can process secondary considerations in order to determine which cloud 402, 404 is to be selected to receive allocation of the first deployment unit 414. For example, the server 432 can consider the price for services provided by the respective clouds 402, 404 or that provides most desirable performance characteristics, and select the cloud 402 (from among the clouds 402, 404 that satisfy the requirements) that is least expensive to use and/or that provides the best performance. Accordingly, the server 432 can allocate and communicate the first deployment unit 414 to the cloud 402, which can deploy the first deployment unit 414 across one or more nodes of the cloud 402.

In another example, based on the audit, the server 432 can determine that the cloud 402 does not satisfy all of the requirements indicated by the context 420 associated with a second deployment unit 416, but that the cloud 404 does satisfy these requirements. Accordingly, the server 432 can allocate and communicate the second deployment unit 416 to the cloud 404, which can deploy the second deployment unit 416 across one or more nodes of the cloud 404. Of course, additional deployment units 412 can be deployed to the cloud 402, the cloud 404, or one or more other clouds (not shown).

From the perspective of the client 430, the plurality of clouds 402, 404 to which the deployment units 412 are allocated can, together, appear as a single resource, for instance as a single cloud. In other words, the client 430 can request of the server 432 that the workload be deployed to a resource, and the server 432 can automatically allocate the deployment units 412 to the various clouds 402, 404.

Prior to the server 432 allocating, or when the server 432 allocates, the deployment units 412 among the plurality of clouds 402, 404, the server 432 can automatically create a deployment plan 440 that identifies to which clouds various ones of the deployment units 412 are to be allocated, or are allocated (and thus deployed). The deployment plan 440 also can identify when deployment units 412 are to be allocated to certain clouds 402, 404. For example, workloads that are not persisted to a cloud 402, 404 can be time sensitive, and certain clouds 402, 404 may provide higher performance at certain times of the day, on certain days of the week or month, etc. Accordingly, the deployment plan 440 can indicate to which cloud a deployment unit 412 is to be allocated to a particular cloud 402, 404, and when the deployment unit is to be allocated to that cloud 402, 404. In this regard, the deployment plan 440 can indicate to allocate a deployment unit 412 to the cloud 402 at a certain time of day, and allocate the deployment unit 412 to the cloud 404 at a different time of day.

The server 432 can maintain the deployment plan 440 locally, for example on a computer-readable storage medium within the server 432 or otherwise communicatively linked to the server, or allocate the deployment plan 440 to one or more of the clouds 402, 404, in which case the server can locally store data indicating to which cloud 402, 404 the deployment plan 440 is allocated. The deployment plan 440 can be embodied as a data table, for example within a database, a hash table, or in any other suitable file structure. The server 432 can access the deployment plan 440 when the workload 410, or one or more deployment units 412, are required to be processed or accessed. Such processing or access can be initiated at the behest of the server 432, at the behest of the client 430, or at the behest of another server or client.

The services provided by one or more clouds 402, 404 and/or the performance capability of the clouds 402, 404 may change over time. Accordingly, an audit procedure can be implemented to query the clouds 402, 404 to which the deployment units 412 are allocated to determine their present security policies and/or performance characteristics, and the server 432 can automatically reallocate one or more of the deployment units 412 based on the results of such queries, when appropriate, for example if the security policies and/or performance characteristics no longer satisfy functional and/or non-functional requirements indicated by the contexts associated with the deployment units. When the server 432 reallocates one of more of the deployment units 412, the server 432 can automatically update the deployment plan 440.

Figure 5:
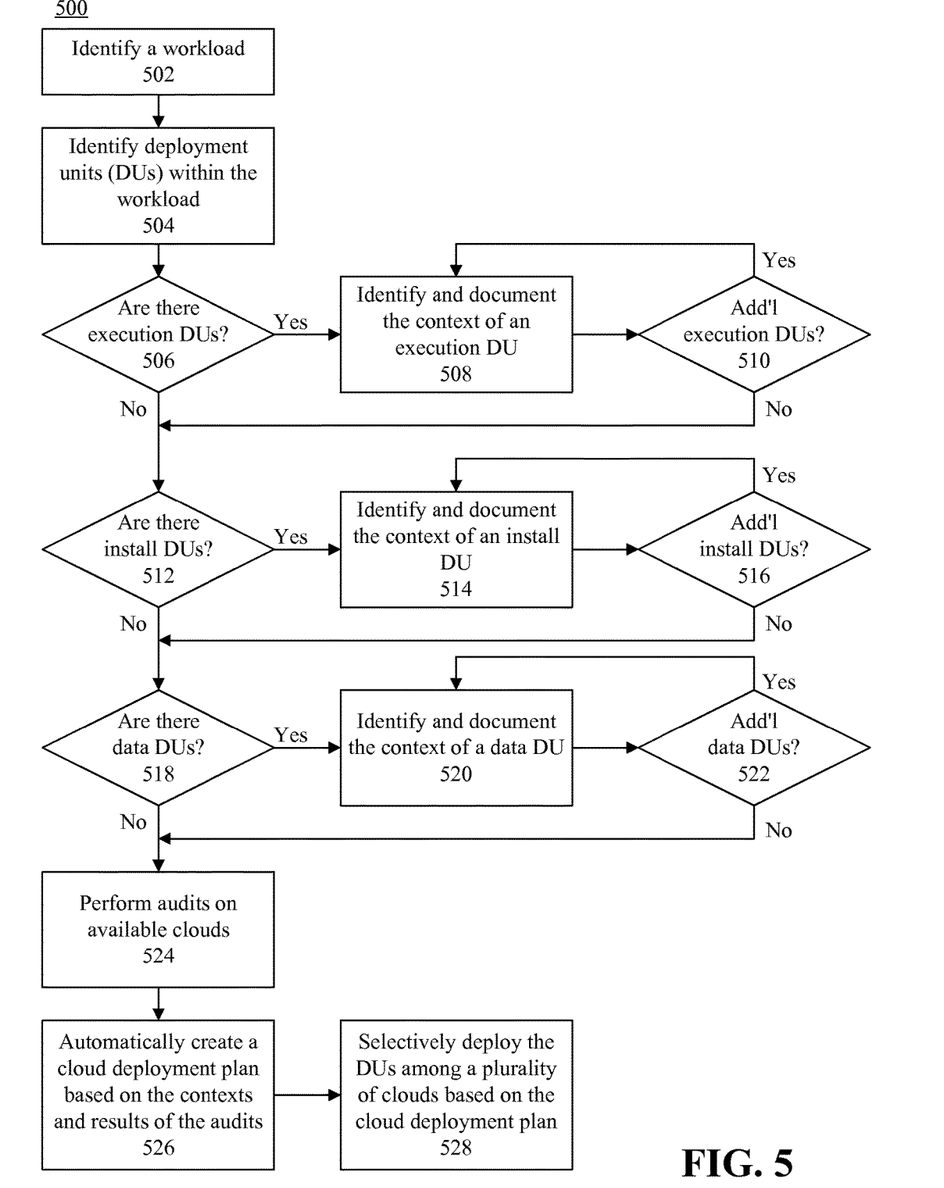
FIG. 5 is a flow chart illustrating a method of selectively allocating a plurality of deployment units among a plurality of clouds in accordance with another embodiment of the present invention.

FIG. 5 is a flow chart illustrating a method 500 of selectively allocating a plurality of deployment units among a plurality of clouds in accordance with another embodiment of the present invention. At step 502, a workload to be allocated among one or more clouds can be identified. For example, the workload can be received from a client or a server, for example via a client or user portal. At step 504, deployment units within the workload can be identified.

At decision box 506, a determination can be made whether the workload comprises any execution deployment units. As used herein, the term "execution deployment unit" means a deployment unit that contains instructions associated with how, when or where (i.e., on what type of device or system) the workload is to be executed. If the workload comprises one or more execution deployment units, at step 508 the server can identify context associated with a first of the execution deployment units and document this context. At decision box 510, the server can determine whether the workload comprises one or more additional execution deployment units. If so, the process can return to step 508 and the server can identify context associated with a next execution deployment unit and document this context. The process again can proceed to decision box 510 and continue until no additional execution deployment units are identified in the workload, at which point the process can proceed to decision box 512.

At decision box 512, a determination can be made whether the workload comprises any installation deployment units. As used herein, the term "installation deployment unit" means a deployment unit that contains information, data and/or programs/applications associated with operation of the workload, for example operating systems, software stacks, etc., and how, when or where (i.e., on what type of device or system) the workload is to be placed (e.g., stored) and/or installed. If the workload comprises one or more installation deployment units, at step 514 the server can identify context associated with a first of the installation deployment units and document this context. At decision box 516, the server can determine whether the workload comprises one or more additional installation deployment units. If so, the process can return to step 514 and the server can identify context associated with a next installation deployment unit and document this context. The process again can proceed to decision box 516 and continue until no additional installation deployment units are identified in the workload, at which point the process can proceed to decision box 518.

At decision box 518, a determination can be made whether the workload comprises any data deployment units. As used herein, the term "data deployment unit" means a deployment unit that comprises data which is directly associated with the workload and which is to be processed (e.g., via an application or other software), and how, when or where (i.e., on what type of device or system) the data is to be placed (e.g., stored). If the workload comprises one or more data deployment units, at step 520 the server can identify context associated with a first of the data deployment units and document this context. At decision box 522, the server can determine whether the workload comprises one or more additional data deployment units. If so, the process can return to step 520 and the server can identify context associated with a next data deployment unit and document this context. The process again can proceed to decision box 522 and continue until no additional data deployment units are identified in the workload, at which point the process can proceed to step 524.

At this point it should be noted that the types of deployment units described with reference to FIG. 5 are merely examples of the types of deployment units that may be associated with a workload. The invention is not limited to these specific examples. For example, presentation deployment units, or any other deployment units, can be associated with a workload, and such deployment units are within the scope of the present invention.

At step 524, the server can automatically perform an audit of available clouds to determine which clouds are suitable to receive allocation of the various deployment units based on the documented contexts of the deployment units. As noted, the audit can identify both functional and non-functional capabilities of the various clouds, as well as prices and/or other costs associated with their use. At step 524, based on the identified contexts for the various deployment units and the information obtained from the audits performed, the server can automatically create a cloud deployment plan that indicates which ones of the clouds satisfy respective ones of the contexts, and to which one of the plurality of clouds that each of the respective deployment units is to be allocated. At step 528, based on the cloud deployment plan, the server can automatically allocate the deployment units among various ones of the available clouds. For instance, a first cloud can be selected to receive a first deployment unit based on the deployment plan, and the first deployment unit can be deployed to the first cloud. Further, a second cloud can be selected to receive a second deployment unit based on the deployment plan, and the first deployment unit can be deployed to the second cloud, and so on.

Like numbers have been used to refer to the same items throughout this specification. The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "include" and/or "including," when used in this specification, specify the presence of stated features, integers, steps, operations, elements, and/or components, but do not preclude the presence or addition of one or more other features, integers, steps, operations, elements, components, and/or groups thereof.

Moreover, as used herein, ordinal terms (e.g. first, second, third, fourth, fifth, and so on) distinguish one cloud, deployment unit, context, audit, or the like from another cloud, deployment unit, context, audit, or the like. Thus, an ordinal term used herein need not indicate a specific position in an ordinal series. For example, a deployment unit identified as a "second deployment unit" may occur within a workload before a deployment unit identified as a "first deployment unit." Moreover, one or more deployment units may occur between a first deployment unit and a second deployment unit.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A method of selectively allocating a plurality of deployment units among a plurality of clouds, the method comprising:
    identifying a first context indicating at least a first functional requirement or non-functional requirement of a first deployment unit within a workload, wherein the first deployment unit is a first asset of the workload selected from a group consisting of a first execution deployment unit, a first installation deployment unit and a first data deployment unit, and identifying a second context indicating at least a second functional requirement or non-functional requirement of a second deployment unit within the workload, wherein the second deployment unit is a second asset of the workload selected from a group consisting of a second execution deployment unit, a second installation deployment unit and a second data deployment unit;
    based on the first context, identifying a first of the plurality of clouds that satisfies the first functional requirement or non-functional requirement indicated by the first context and, via a processor, automatically allocating the first deployment unit to the first cloud; and
    based on the second context, identifying a second of the plurality of clouds that satisfies the first functional requirement or non-functional requirement indicated by the second context, wherein the first cloud does not satisfy the second functional requirement or non-functional requirement indicated by the second context, and automatically allocating the second deployment unit to the second cloud.

2. The method of claim 1, further comprising:
    based at least in part on the first context and the second context, automatically creating a deployment plan that identifies to which of at least the first and second clouds the first deployment unit is allocated and to which of at least the first and second clouds the second deployment unit is allocated.

3. The method of claim 1, wherein:
    automatically allocating the first deployment unit to the first cloud comprises selecting the first cloud based on the deployment plan; and
    automatically allocating the second deployment unit to the second cloud comprises selecting the second cloud based on the deployment plan.

4. The method of claim 1, wherein:
    identifying the first context indicating at least the first functional requirement or non-functional requirement of the first deployment unit within the workload comprises identifying metadata associated with the first deployment unit indicating a first functional requirement of the first deployment unit; and
    identifying the second context indicating at least the second functional requirement or non-functional requirement of the second deployment unit within the workload comprises identifying metadata associated with the second deployment unit indicating a second functional requirement of the second deployment unit.

5. The method of claim 4, wherein the first functional requirement of the first deployment unit and the second functional requirement of the second deployment unit each are performance requirements.

6. The method of claim 1, wherein:
    identifying the first context indicating at least the first functional requirement or non-functional requirement of the first deployment unit within the workload comprises identifying metadata associated with the first deployment unit indicating a first non-functional requirement of the first deployment unit; and
    identifying the second context indicating at least the second functional requirement or non-functional requirement of the second deployment unit within the workload comprises identifying metadata associated with the second deployment unit indicating a second non-functional requirement of the second deployment unit.

7. The method of claim 6, wherein the first non-functional requirement of the first deployment unit and the second non-functional requirement of the second deployment unit each are security requirements.

8. The method of claim 1, further comprising:
    after the respective first and second deployment units have been allocated to the respective first and second clouds, determining whether the first cloud continues to satisfy the requirement indicated by the first context;
    when the first cloud does not satisfy the requirement indicated by the first context, based on the first context, identifying at least one other cloud that satisfies the requirement indicated by the first context; and
    automatically allocating the first deployment unit to the other cloud.

9. A system comprising:
    at least one memory; and
    a processor configured to initiate executable operations comprising:
        identifying a first context indicating at least a first functional requirement or non-functional requirement of a first deployment unit within a workload, wherein the first deployment unit is a first asset of the workload selected from a group consisting of a first execution deployment unit, a first installation deployment unit and a first data deployment unit, and identifying a second context indicating at least a second functional requirement or non-functional requirement of a second deployment unit within the workload, wherein the second deployment unit is a second asset of the workload selected from a group consisting of a second execution deployment unit, a second installation deployment unit and a second data deployment unit;
        based on the first context, identifying a first of the plurality of clouds that satisfies the first functional requirement or non-functional requirement indicated by the first context and automatically allocating the first deployment unit to the first cloud; and
        based on the second context, identifying a second of the plurality of clouds that satisfies the first functional requirement or non-functional requirement indicated by the second context, wherein the first cloud does not satisfy the second functional requirement or non-functional requirement indicated by the second context, and automatically allocating the second deployment unit to the second cloud.

10. The system of claim 9, wherein the processor further is configured to initiate executable operations comprising:
based at least in part on the first context and the second context, automatically creating a deployment plan that identifies to which of at least the first and second clouds the first deployment unit is allocated and to which of at least the first and second clouds the second deployment unit is allocated.

11. The system of claim 9, wherein:
automatically allocating the first deployment unit to the first cloud comprises selecting the first cloud based on the deployment plan; and
automatically allocating the second deployment unit to the second cloud comprises selecting the second cloud based on the deployment plan.

12. The system of claim 9, wherein:
identifying the first context indicating at least the first functional requirement or non-functional requirement of the first deployment unit within the workload comprises identifying metadata associated with the first deployment unit indicating a first functional requirement of the first deployment unit; and
identifying the second context indicating at least the second functional requirement or non-functional requirement of the second deployment unit within the workload comprises identifying metadata associated with the second deployment unit indicating a second functional requirement of the second deployment unit.

13. The system of claim 12, wherein the first functional requirement of the first deployment unit and the second functional requirement of the second deployment unit each are performance requirements.

14. The system of claim 9, wherein:
identifying the first context indicating at least the first functional requirement or non-functional requirement of the first deployment unit within the workload comprises identifying metadata associated with the first deployment unit indicating a first non-functional requirement of the first deployment unit; and
identifying the second context indicating at least the second functional requirement or non-functional requirement of the second deployment unit within the workload comprises identifying metadata associated with the second deployment unit indicating a second non-functional requirement of the second deployment unit.

15. The system of claim 14, wherein the first non-functional requirement of the first deployment unit and the second non-functional requirement of the second deployment unit each are security requirements.

16. The system of claim 9, wherein the processor further is configured to initiate executable operations comprising:
after the respective first and second deployment units have been allocated to the respective first and second clouds, determining whether the first cloud continues to satisfy the requirement indicated by the first context;
when the first cloud does not satisfy the requirement indicated by the first context, based on the first context, identifying at least one other cloud that satisfies the requirement indicated by the first context; and
automatically allocating the first deployment unit to the other cloud.

17. A computer program product for allocating a plurality of deployment units among a plurality of clouds, said computer program product comprising:
a computer-readable storage medium having stored thereon program code that, when executed, configures a processor to perform executable operations comprising:
identifying a first context indicating at least a first functional requirement or non-functional requirement of a first deployment unit within a workload, wherein the first deployment unit is a first asset of the workload selected from a group consisting of a first execution deployment unit, a first installation deployment unit and a first data deployment unit, and identifying a second context indicating at least a second functional requirement or non-functional requirement of a second deployment unit within the workload, wherein the second deployment unit is a second asset of the workload selected from a group consisting of a second execution deployment unit, a second installation deployment unit and a second data deployment unit;
based on the first context, identifying a first of the plurality of clouds that satisfies the first functional requirement or non-functional requirement indicated by the first context and automatically allocating the first deployment unit to the first cloud; and
based on the second context, identifying a second of the plurality of clouds that satisfies the first functional requirement or non-functional requirement indicated by the second context, wherein the first cloud does not satisfy the second functional requirement or non-functional requirement indicated by the second context, and automatically allocating the second deployment unit to the second cloud.

18. The computer program product of claim 17, the executable operations further comprising:
based at least in part on the first context and the second context, automatically creating a deployment plan that identifies to which of at least the first and second clouds the first deployment unit is allocated and to which of at least the first and second clouds the second deployment unit is allocated;
performing a first audit of the first cloud to determine whether the first cloud satisfies the first functional requirement or non-functional requirement indicated by the first context and whether the first cloud satisfies the second functional requirement or non-functional requirement indicated by the second context, wherein performing the first audit comprises processing a first location model associated with the first cloud; and
performing a second audit of the second cloud to determine whether the second cloud satisfies the first functional or non-functional requirement indicated by the first context and whether the second cloud satisfies the second functional requirement or non-functional requirement indicated by the second context, wherein performing the second audit comprises processing a second location model associated with the second cloud;
wherein automatically creating the deployment plan further is based on results of the first and second audits.

19. The computer program product of claim 17, wherein:
identifying the first context indicating at least the first functional requirement or non-functional requirement of the first deployment unit within the workload comprises identifying metadata associated with the first deployment unit indicating a first functional requirement of the first deployment unit; and identifying the second context indicating at least the second functional requirement or non-functional requirement of the second deployment unit within the workload comprises identifying metadata associated with the second deployment unit indicating a second functional requirement of the second deployment unit.

20. The computer program product of claim 17, wherein:

identifying the first context indicating at least the first functional requirement or non-functional requirement of the first deployment unit within the workload comprises identifying metadata associated with the first deployment unit indicating a first non-functional requirement of the first deployment unit; and identifying the second context indicating at least the second functional requirement or non-functional requirement of the second deployment unit within the workload comprises identifying metadata associated with the second deployment unit indicating a second non-functional requirement of the second deployment unit.

* * * * *